United States Patent
Klop et al.

(10) Patent No.: US 9,956,993 B1
(45) Date of Patent: May 1, 2018

(54) VEHICLE FRONT IMPACT SENSOR WITH IMPACT RESISTANT CARRIAGE

(71) Applicant: Ford Global Technologies, LLC, Dearborn, MI (US)

(72) Inventors: Aaron Peter Klop, Bloomfield Hills, MI (US); Robert Vasbinder, Bundee, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/411,035

(22) Filed: Jan. 20, 2017

(51) Int. Cl.
*G01S 13/00* (2006.01)
*B62D 21/15* (2006.01)
*G01S 13/93* (2006.01)
*B60R 19/48* (2006.01)
*G01S 7/02* (2006.01)

(52) U.S. Cl.
CPC .......... *B62D 21/155* (2013.01); *B60R 19/483* (2013.01); *G01S 13/931* (2013.01); *B60Y 2306/01* (2013.01); *G01S 2007/027* (2013.01)

(58) Field of Classification Search
CPC ........ G01S 17/936; G01S 7/4813; G01S 7/02; G01S 2013/9375; H01Q 1/42; H01Q 1/3233; B60R 19/483; B60R 19/52; B60R 2019/525
USPC ........ 180/167, 169; 342/27, 70, 72; 343/713
See application file for complete search history.

(56) References Cited

U.S. PATENT DOCUMENTS

| | | | |
|---|---|---|---|
| 6,720,884 B2 * | 4/2004 | O'Connor | B60R 11/02 172/6 |
| 6,842,152 B2 * | 1/2005 | Kikuchi | G01S 7/4026 342/70 |
| 7,675,460 B2 * | 3/2010 | Sanada | G01S 7/4026 180/167 |
| 7,988,212 B2 * | 8/2011 | Hartley | B60R 19/483 293/117 |
| 9,348,014 B2 | 5/2016 | Lee et al. | |
| 9,673,517 B2 * | 6/2017 | Tran | H01Q 1/1207 |
| 9,682,728 B2 * | 6/2017 | Taneda | B62D 25/085 |
| 9,804,261 B2 * | 10/2017 | Dechoux | B60R 19/483 |
| 2005/0062641 A1 * | 3/2005 | Kakishita | G01S 7/03 342/70 |
| 2010/0321230 A1 * | 12/2010 | Takeuchi | G01S 7/03 342/70 |
| 2012/0007764 A1 * | 1/2012 | Kawasaki | B60R 19/483 342/70 |

(Continued)

FOREIGN PATENT DOCUMENTS

| | | |
|---|---|---|
| FR | 3014404 | 6/2015 |
| JP | 03191699 | 7/2001 |
| JP | 2007030535 | 2/2007 |

(Continued)

*Primary Examiner* — Toan To
(74) *Attorney, Agent, or Firm* — Jason Rogers; Price Heneveld LLP (57) ABSTRACT

A vehicular radar assembly includes a radar mount positioned proximate an engine compartment within a vehicle. A radar carriage is slidably coupled to the radar mount and having a radar module coupled thereto. A biasing mechanism biases the radar carriage away from the radar mount toward a use position. Imposition of an impact force against the radar module temporarily overcomes the biasing mechanism and biases the radar carriage toward the radar mount.

20 Claims, 6 Drawing Sheets

(56) References Cited

U.S. PATENT DOCUMENTS

2013/0141269 A1* 6/2013 Schneider ............ H01Q 1/3233
                                                    342/70
2014/0111370 A1* 4/2014 Aleem .................. B60R 19/483
                                                    342/70

FOREIGN PATENT DOCUMENTS

| JP | 2009287950 | 12/2009 |
| JP | 2015140029 | 8/2015 |
| KR | 1650890 | 8/2016 |

* cited by examiner

VEHICLE FRONT IMPACT SENSOR WITH IMPACT RESISTANT CARRIAGE

FIELD OF THE INVENTION

The present invention generally relates to vehicle proximity sensors, and more specifically, a front braking sensor that is mounted behind a frontal impact surface of a vehicle.

BACKGROUND OF THE INVENTION

Various vehicles include proximity sensors that are mounted around the perimeter of a vehicle. These sensors inform users of the vehicle about objects that are within a certain distance of the vehicle.

SUMMARY OF THE INVENTION

According to one aspect of the present invention, a vehicular radar assembly includes a radar mount positioned proximate an engine compartment within a vehicle. A radar carriage is slidably coupled to the radar mount and has a radar module coupled thereto. A biasing mechanism biases the radar carriage away from the radar mount toward a use position. Imposition of an impact force against the radar module temporarily overcomes the biasing mechanism and biases the radar carriage toward the radar mount.

According to another aspect of the present invention, a vehicle includes a radar mount coupled to a frame. A radar carriage is biased away from the radar mount to a use position. A radar module is coupled to the radar carriage. When an impact force is exerted against the radar module, the radar carriage is biased toward the radar mount until the impact force is removed, and the radar carriage is returned to the use position.

According to another aspect of the present invention, a vehicle radar assembly includes a radar module attached to a radar carriage. A radar mount slidably engages the radar carriage, wherein the radar carriage is biased away from the radar mount to a use position. A sliding assembly is defined between the radar mount and the radar carriage that defines a generally linear movement of the radar carriage in the event of an impact force exerted against the radar module.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
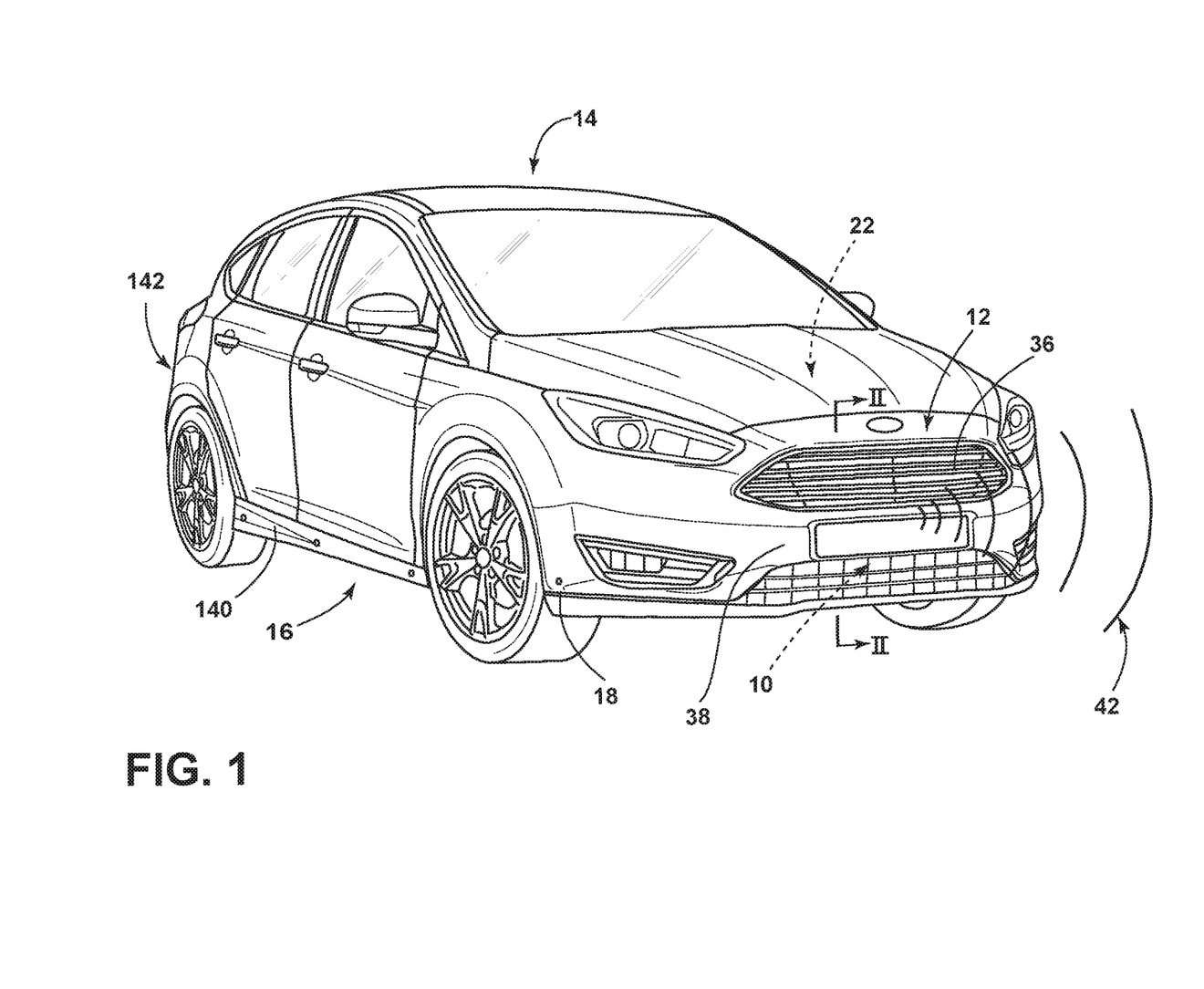
FIG. 1 is a front perspective view of a vehicle that incorporates an aspect of the impact-resistant radar module.
Figure 2:
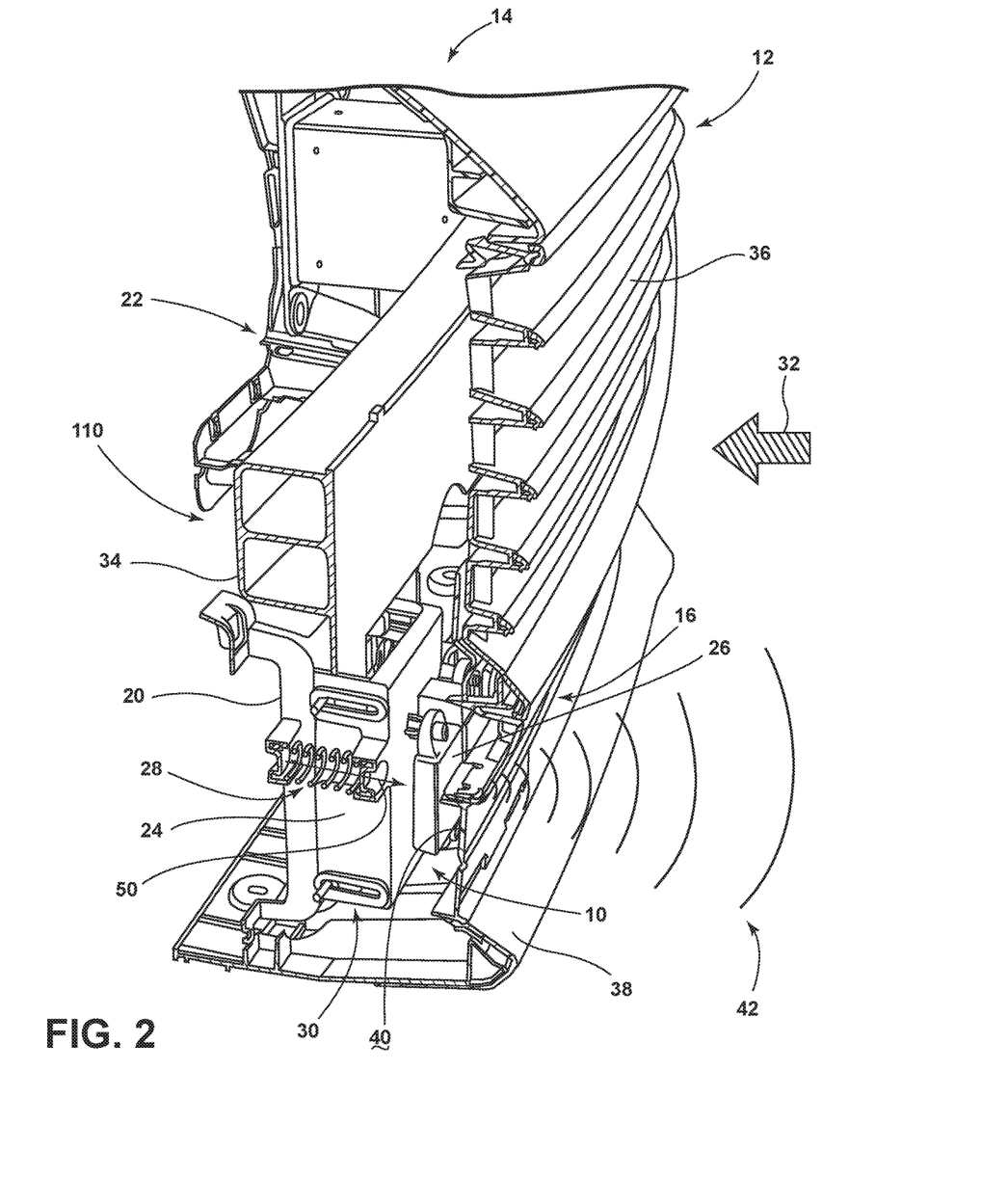
FIG. 2 is a cross-sectional view of the vehicle of FIG. 1 taken along line II-II and showing the impact-resistant radar assembly in a use position.
Figure 3:
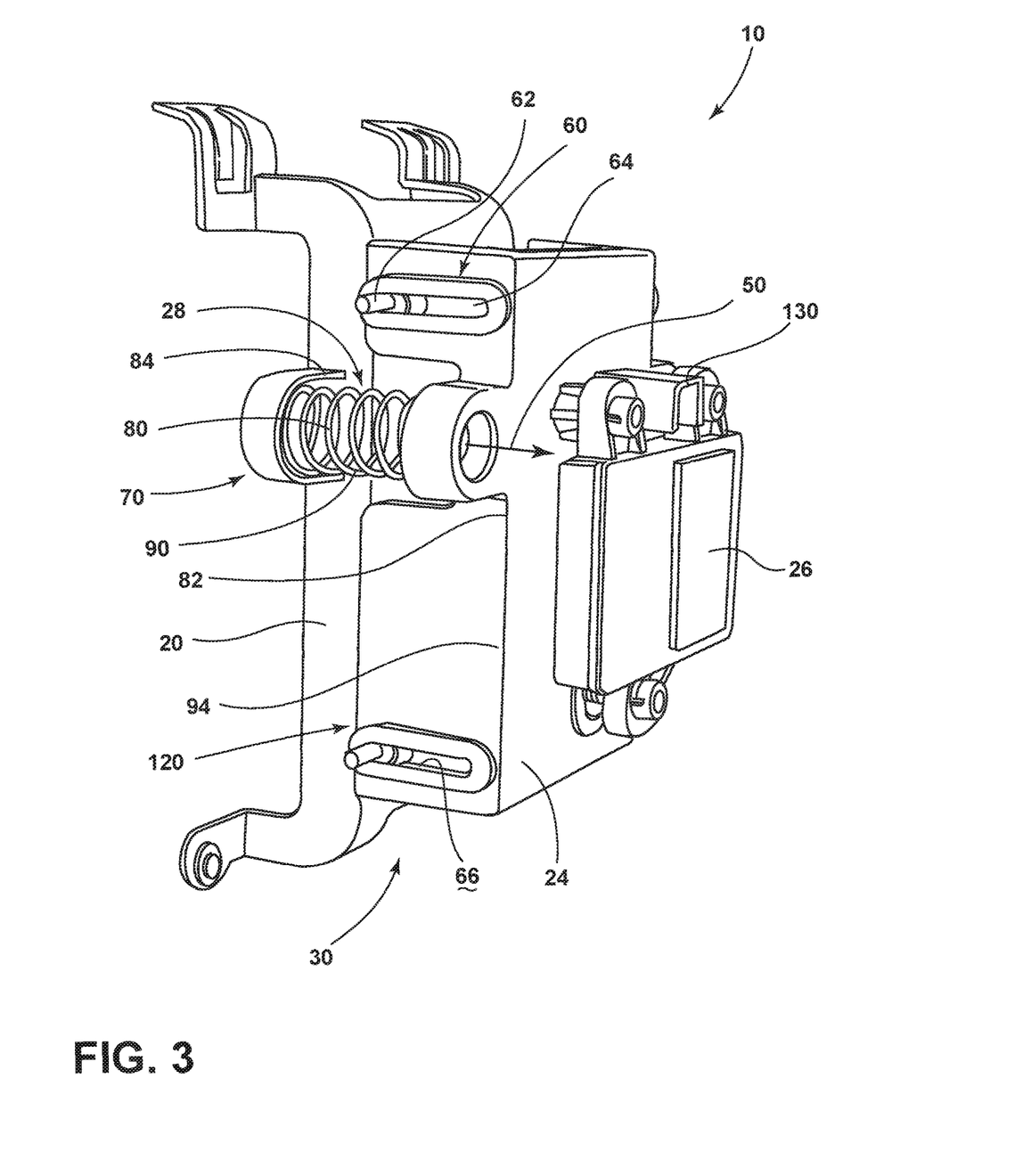
FIG. 3 is a side perspective view of the impact-resistant radar assembly shown in the use position.
Figure 4:
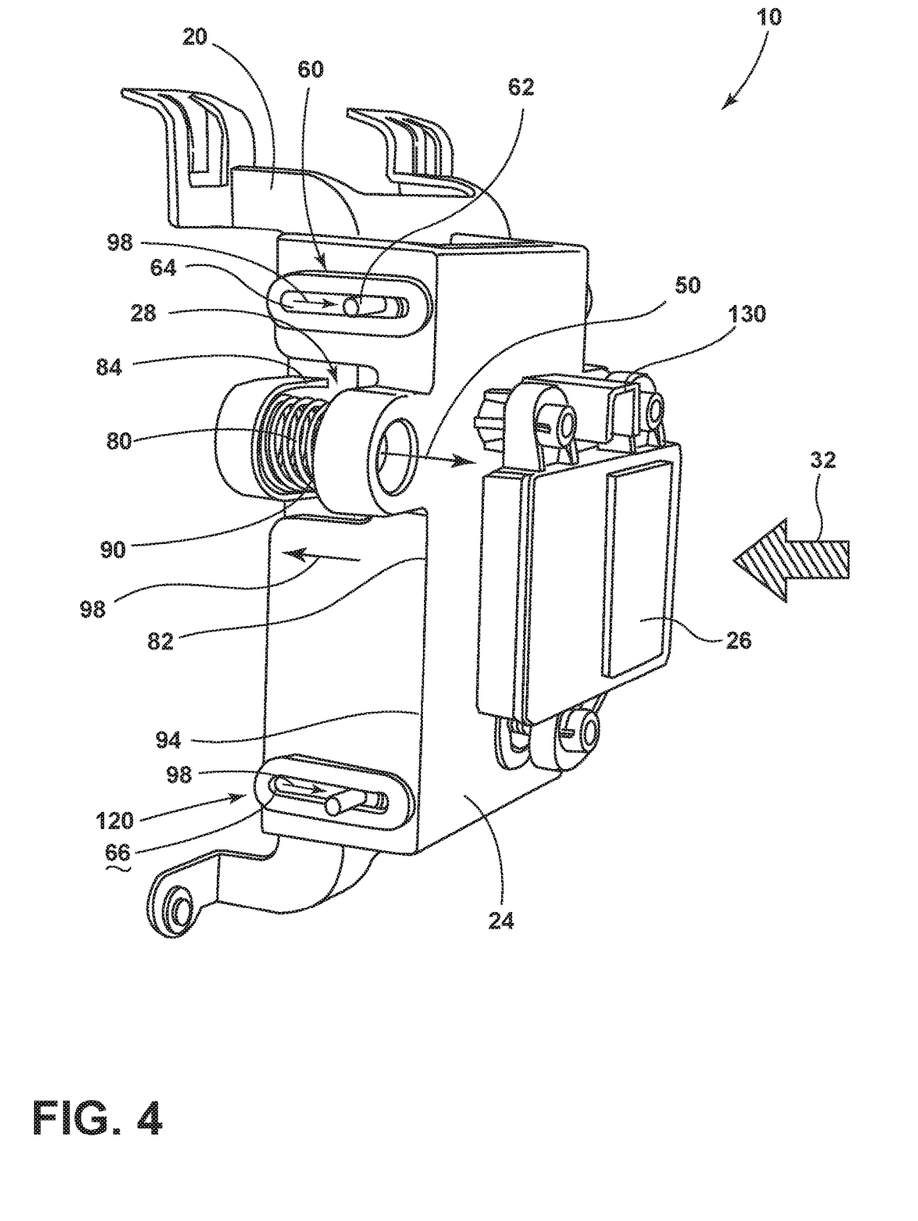
FIG. 4 is a side perspective view of the impact-resistant radar assembly of FIG. 3 shown in a biased position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-6, reference numeral 10 generally refers to an impact-resistant radar assembly that can be mounted within a front portion 12 of a vehicle 14. In this position, the impact-resistant radar assembly 10 uses various positioning signals 42 (radar, light waves, lasers, sonic frequencies, and others) to monitor the proximity of objects relative to the front portion 12 of the vehicle 14. The impact-resistant radar assembly 10 can be part of a vehicular radar system 16 that can be defined within the front portion 12 of the vehicle 14 or around the entire outer perimeter 18 of the vehicle 14. The impact-resistant radar assembly 10 can include a radar mount 20 that is positioned proximate an engine compartment 22 within a vehicle 14. A radar carriage 24 is slidably coupled to the radar mount 20. A radar module 26 is coupled to the radar carriage 24 such that the radar carriage 24 is slidably operable with respect to the radar mount 20. A biasing mechanism 28 serves to bias the radar carriage 24 away from the radar mount 20 and toward a use position 30 of the radar module 26. It is contemplated that the imposition of an impact force 32, typically a minimal impact force 32, against the front portion 12 of the vehicle 14 serves to temporarily overcome the biasing mechanism 28. This impact force 32 serves to bias the radar carriage 24 toward the radar mount 20.

Referring again to FIGS. 1 and 2, the radar mount 20 can be a rigid bracket that is fixedly attached to a metal bumper beam 34 mounted behind a front grill 36 of the vehicle 14. The radar mount 20 is positioned on the metal bumper beam 34 and can be oriented such that the positioning signals 42 used for sensing object proximity can be emitted from and received by the radar module 26 of the impact-resistant radar assembly 10. The radar module 26 is positioned behind a frontal impact surface 38 of the vehicle 14. The frontal impact surface 38 is typically positioned near the front grill 36. This frontal impact surface 38 is designed to absorb minimal impact forces 32 that may be experienced at low speeds. Such low speed collisions typically result in little to no permanent exterior body damage. The types of impact forces 32 contemplated are those experienced at low speeds, such as below 10 miles per hour and typically below five miles per hour.

As exemplified in FIGS. 2-6, as the frontal impact surface 38 absorbs the force of this minimal impact, the frontal impact surface 38 can deflect inward and toward the radar module 26. The backside 40 of frontal impact surface 38 can engage the radar module 26 and can transfer the impact force 32 against the radar module 26. This impact force 32 overcomes the outward biasing force 50 exerted by the biasing mechanism 28 and serves to operate the radar module 26 and the radar carriage 24 inward toward the radar mount 20. When the frontal impact force 32 is removed, the biasing mechanism 28 continues to exert the outward biasing force 50. This outward biasing force 50 returns the radar carriage 24 and the radar module 26 to the use position 30, as the frontal impact surface 38 returns to its original shape, or substantially its original shape, after the impact force 32 is removed.

Through the use of the impact-resistant radar assembly 10, minimal impacts that are absorbed by the frontal impact surface 38 can also be absorbed through the sliding engagement of the radar mount 20 and the radar carriage 24 to prevent or substantially prevent damage to the radar module 26 during such minimal impact. Additionally, the impact-resistant radar assembly 10 allows for placement of the radar module 26 at an extreme forward position of the vehicle 14. This forward positioning provides for more effective sensing operation for determining the proximity of objects exterior of the vehicle 14.

Referring again to FIGS. 2-6, a sliding assembly 60 can be defined between the radar mount 20 and the radar carriage 24. The sliding assembly 60 defines the use position 30 and guides the sliding operation of the radar carriage 24 relative to the radar mount 20 during imposition and removal of the frontal impact force 32. This sliding assembly 60 can include a tab 62 that extends between the radar mount 20 and radar carriage 24. This tab 62 can extend through a guide slot 64 that is defined within the other of the radar mount 20 and the radar carriage 24. Typically, the tab 62 can extend from the radar mount 20 and pass through a guide slot 64 that is defined within the radar carriage 24. It should be understood that the tab 62 can extend from the radar carriage 24 and can extend through a guide slot 64 that is defined within the radar mount 20. Other similar sliding and guide mechanisms can be incorporated to control the movement of the radar carriage 24 with respect to the radar mount 20.

As exemplified in FIGS. 2-6, the biasing mechanism 28 can cooperate with the sliding assembly 60 to at least partially load the biasing mechanisms 28 to define the use position 30. By partially loading the biasing mechanism 28, the radar carriage 24 is maintained in a substantially stable position relative to the radar mount 20. In the pre-loaded state 70, or partially-loaded state, a portion of the tabs 62 is held against a portion of the slot 64. The outward biasing force 50 of the biasing mechanism 28 holds the tabs 62 against the outer surface 66 that defines the slot 64. In this manner, the pre-loaded state 70 of the biasing mechanism 28 can serve to minimize vibration and wobble of the sliding carriage and the radar module 26 during use of the vehicle 14. Accordingly, the pre-loaded state 70 of the biasing mechanism 28 serves to maintain the radar module 26 in a substantially consistent position to accurately measure proximity of various objects that may be positioned around the vehicle 14 during use.

Referring to FIGS. 3-6, the biasing mechanism 28 can include at least one spring 80, such as at least one compression spring, and typically includes two or more springs 80 that are spaced along outer edges 82 of the radar mount 20 and radar carriage 24. The radar mount 20 and radar carriage 24 can each include a spring seat 84. Each spring 80 of the biasing mechanism 28 is adapted to be seated within corresponding spring seats 84 of the radar mount 20 and radar carriage 24. The biasing mechanism 28 in the use position 30 can be at least partially compressed between the radar mount 20 and the radar carriage 24 in the pre-loaded state 70 while mounted within the various spring seats 84 of the impact-resistant radar assembly 10.

Typically, the biasing mechanism 28 may include first and second springs 90, 92. The first spring 90 can be positioned along a first edge 94 of the impact-resistant radar assembly 10 to extend between the spring seats 84 defined within the radar mount 20 and radar carriage 24. A second spring 92 can be positioned along an opposing second edge 96 of the impact-resistant radar assembly 10 to extend between the spring seats 84 defined within the radar mount 20 and the radar carriage 24. By using first and second springs 90, 92, the radar carriage 24 can slidably operate relative to the radar mount 20 in more than just a linear movement 98.

Figure 5:
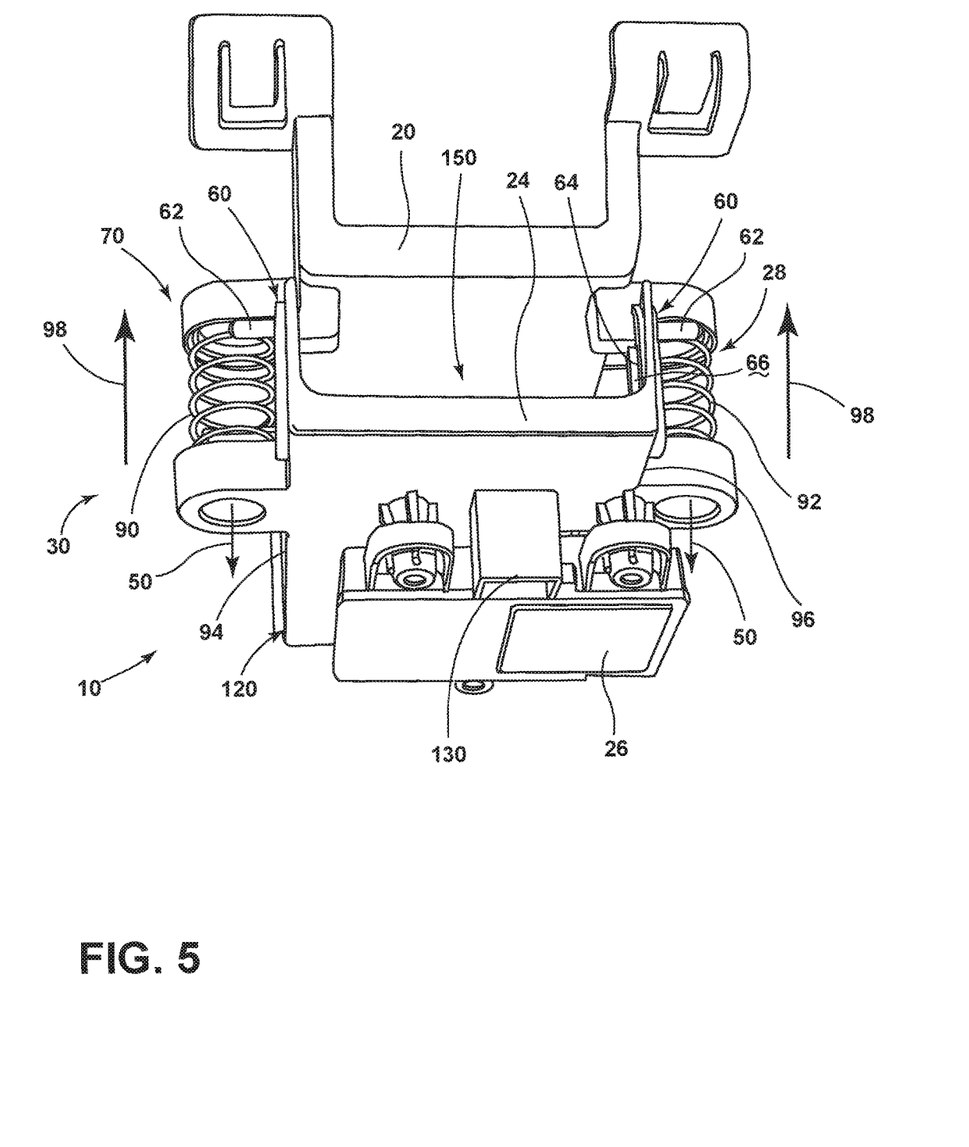
FIG. 5 is a top perspective view of the impact-resistant radar assembly of FIG. 3.
Figure 6:
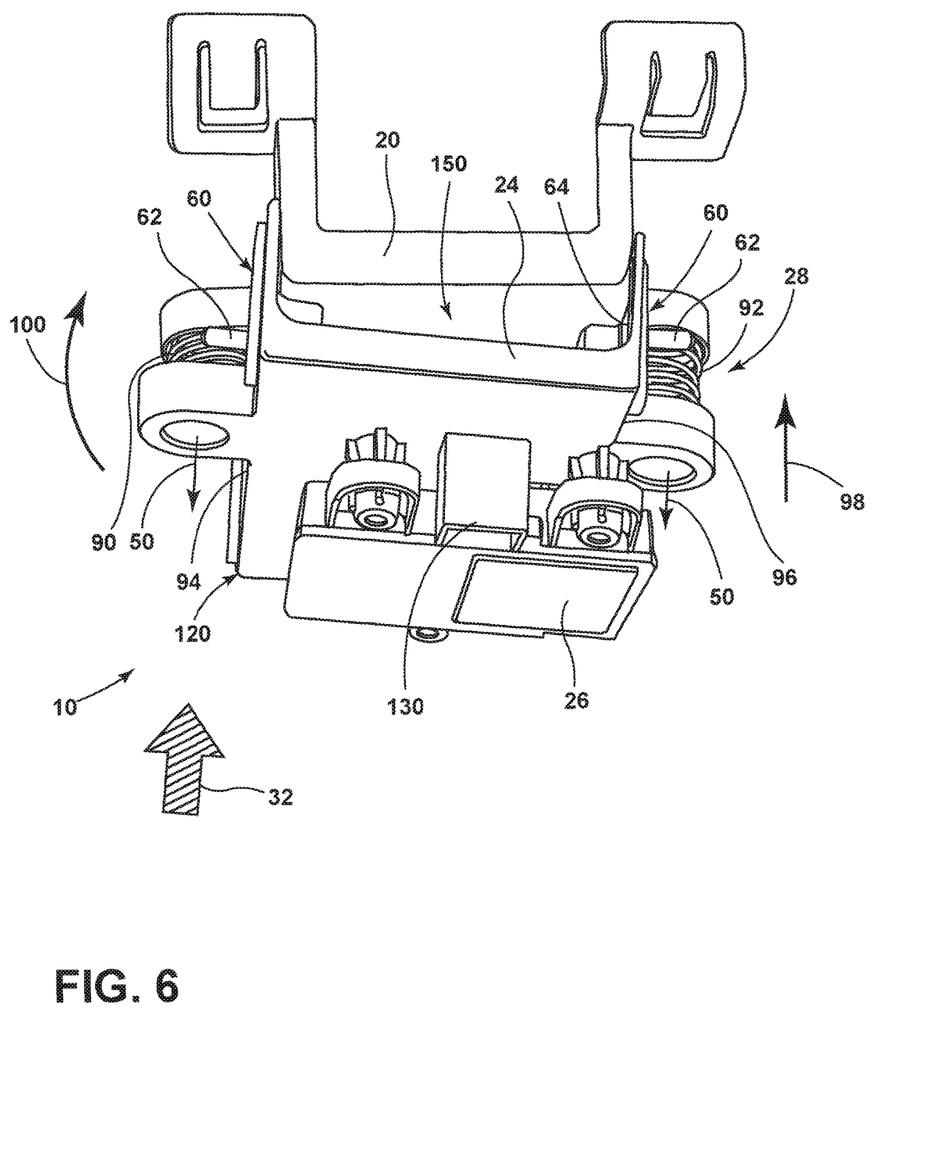
FIG. 6 is a top perspective view of the impact-resistant radar assembly of FIG. 5 shown in a biased position.

By way of example, and not limitation, as exemplified in FIGS. 5 and 6, where a frontal impact force 32 is received by the frontal impact surface 38 off-center or at an angle, the frontal impact force 32 may be transmitted to the radar module 26 and/or the radar carriage 24 at a similar angle or along only one of the first and second edges 94, 96 of the impact-resistant radar assembly 10. In such an asymmetric imposition of the frontal impact force 32, the radar carriage 24 can be biased toward the radar mount 20 in a generally rotational movement 100. This generally rotational movement 100 may be achieved when only one of the first and second springs 90, 92 is biased away from the use position 30. In such an embodiment, the radar carriage 24 is capable of linear and rotational movement 98, 100 with respect to the radar mount 20.

Referring again to FIGS. 2-6, the radar mount 20 can be coupled to various portions of the frame 110 of the vehicle 14. Such members of the frame 110 can include the metal bumper beam 34, but are also contemplated to include various other members of the frame 110 of the vehicle 14. The radar carriage 24 is coupled to the radar mount 20 and is biased away from the radar mount 20 to define the use position 30. The radar module 26 is coupled to the radar carriage 24. When an impact force 32, typically a frontal impact force 32, is exerted against the radar module 26 and/or the radar carriage 24, the radar carriage 24 is biased toward the radar mount 20 until the impact force 32 is removed. When the frontal impact force 32 is removed, the radar carriage 24 is biased back to the use position 30 through the use of the biasing mechanism 28 that extends between the radar mount 20 and the radar carriage 24. As discussed above, the biasing mechanism 28 is at least partially loaded, or partially compressed when the impact-resistant radar assembly 10 is placed in use position 30.

Referring again to FIGS. 2-6, the sliding assembly 60 that is defined between the radar mount 20 and the radar carriage 24 cooperates with the biasing mechanism 28 to provide a generally linear movement 98 of the radar carriage 24 away from and toward the use position 30. As discussed above, the use of multiple springs 80 within the biasing mechanism 28 can serve to provide a generally rotational movement 100 of the radar carriage 24 relative to the radar mount 20 as well. Accordingly, the radar carriage 24 can define a series of linear and rotational movements 98, 100 away from and toward the use position 30 during the imposition and removal of the frontal impact force 32.

Referring again to FIGS. 2-6, the sliding assembly 60 cooperates with the biasing mechanism 28 to define the use position 30 and also define the movement of the radar carriage 24 relative to the radar mount 20. The sliding assembly 60 can include a plurality of guide slots 64 that are defined within the radar carriage 24. The plurality of guide slots 64 are typically spaced about a perimeter 120 of the radar carriage 24. A plurality of mating tabs 62 that extend outward from the radar mount 20 are adapted to extend through each of the guide slots 64, respectively. In various embodiments, the radar carriage 24 can include four guide slots 64 that are adapted to receive four corresponding mating tabs 62 that extend outward from the radar mount 20. The sliding movement of the mating tabs 62 within the respective guide slot 64 serves to guide the linear and rotational movement 98, 100 of the radar carriage 24 with respect to the radar mount 20. The biasing mechanism 28 provides a substantially constant outward biasing force 50 that tends the radar carriage 24 and the radar module 26 toward the use position 30. As discussed above, the biasing mechanism 28 holds the tabs 62 against an outer surface 66 of the slots 64 to maintain the radar module 26 in the use position until the impact force 32 is experienced. In turn, the sliding assembly 60 directs the outward biasing force 50 imposed by the biasing mechanism 28 to substantially return the radar carriage 24 to the use position 30 after the frontal impact force 32 has been removed.

In various embodiments, the tabs 62 can include a palnut or other enlarged area at the outer end of each tab 62. This enlarged area can serve to prevent the tab 62 from sliding out of engagement with the slot 64 during the imposition of an impact force 32. The enlarged area, typically in the form of a palnut, can be attached to each tab 62 after the tabs 62 are inserted through a corresponding slot 64. The enlarged area included within one or more of the tabs 62 can also be in the form of a molded portion of the tab 62 that is shaped to prevent passage of the tab 62 out of engagement with the slot 64.

This configuration of the radar mount 20 and radar carriage 24 that are connected by the biasing mechanism 28 and sliding assembly 60 serves to protect or substantially protect the radar module 26 in the event of a low speed impact. Accordingly, the radar module 26 is configured to allow for absorption of the impact force 32. This serves to limit the need for replacement of the radar module 26 after each low-speed impact. Additionally, this device allows the radar module 26 to be positioned at an extreme forward position and immediately behind the frontal impact surface 38 of the vehicle 14. This positioning can increase the effectiveness of the radar module 26.

As exemplified in FIGS. 2-6, the impact-resistant radar assembly 10 of the vehicle radar system can include a radar module 26 that is attached to a radar carriage 24. The radar mount 20 is adapted to slidably engage the radar carriage 24. Through this engagement, the radar carriage 24 is biased away from the radar mount 20 to a use position 30 of the radar module 26 with respect to the radar mount 20. A sliding assembly 60 defined between the radar mount 20 and the radar carriage 24 defines a generally linear movement 98 and also a generally rotational movement 100 of the radar carriage 24 with respect to the radar mount 20 in the event of an impact force 32 exerted against the radar module 26 and/or the radar carriage 24.

According to the various embodiments, as exemplified in FIGS. 2-6, it is contemplated that the radar carriage 24 can include an impact member 130 that extends forward of the radar module 26. In such an embodiment, the impact member 130 is adapted to receive at least a portion of the impact force 32 from the backside 40 of the frontal impact surface 38. As this frontal impact force 32 is exerted against, or at least partially against, the impact member 130 of the radar carriage 24, portions of the frontal impact force 32 can be directed away from the radar module 26. These frontal impact forces 32 can be directed through the impact member 130 and be transmitted through the radar carriage 24 to operate the radar carriage 24 and the radar module 26 away from the use position 30 and toward the radar mount 20. It is contemplated that the impact member 130 of the radar carriage 24 is positioned so as not to interfere with the operation of the radar module 26 in transmitting and receiving various frequencies of sound for determining the proximity of objects that are exterior to the vehicle 14.

Referring again to FIGS. 1-6, the impact-resistant radar assembly 10 can be positioned as a front braking module adapted to be positioned proximate and behind a front grill 36 of the vehicle 14. It is also contemplated that the impact-resistant radar assembly 10 can be positioned along one of the side panels 140 or along the rear 142 of the vehicle 14, such that any minimal impact experienced by the vehicle 14 proximate one of the radar modules 26 can be absorbed through operation of the biasing mechanism 28 and sliding assembly 60 of the radar mount 20 and radar carriage 24.

The biasing mechanism 28 of the impact resistant radar module 26 can include first and second springs 90, 92 that are positioned at opposing first and second edges 94, 96 of the impact-resistant radar assembly 10. It is also contemplated that additional springs 80 or similar biasing mechanisms 28 can be positioned around a perimeter of the impact-resistant radar assembly 10, as needed. Additional springs 80 may be included for vehicles 14 that may experience greater vibration or rugged road conditions, such as sport utility vehicles, pick-up trucks, and other similar vehicles 14 that may experience severe driving conditions. It is also contemplated that the biasing mechanism 28 for the impact-resistant radar assembly 10 can include a single spring 80 that is centrally positioned between the radar mount 20 and the radar carriage 24. In such an embodiment, the spring seats 84 of the radar mount 20 and radar carriage 24 can be positioned within the gap 150 defined between the radar mount 20 and the radar carriage 24 when the impact-resistant radar assembly 10 is in the use position 30. Typically, the biasing mechanisms 28 will be positioned outside of the gap 150 between the radar module 26 and the radar carriage 24 and proximate the perimeter 120 of the radar mount and carriage 20, 24.

It is contemplated that the biasing mechanism 28 can include compression springs, coil springs, elastomeric members, cushioning members, combinations thereof and other similar biasing mechanisms 28 that can bias the radar carriage 24 towards the use position 30 and also be biased away from the use position 30 during the imposition of a frontal impact force 32.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicular radar assembly comprising:
    a radar mount positioned proximate an engine compartment within a vehicle;
    a radar carriage slidably coupled to the radar mount and having a radar module coupled thereto; and
    a biasing mechanism that biases the radar carriage away from the radar mount toward a use position; wherein imposition of an impact force against the radar module temporarily overcomes the biasing mechanism and biases the radar carriage toward the radar mount.

2. The vehicular radar assembly of claim 1, wherein removal of the impact force results in the biasing mechanism returning the radar carriage to the use position.

3. The vehicular radar assembly of claim 1, further comprising:
    a sliding assembly defined between the radar mount and the radar carriage, wherein the sliding assembly defines the use position and guides a sliding operation of the radar carriage relative to the radar mount.

4. The vehicular radar assembly of claim 3, wherein the sliding assembly includes a tab that extends from the radar mount through a guide slot defined in the radar carriage.

5. The vehicular radar assembly of claim 4, wherein the use position is defined by a partially-loaded state of the biasing mechanism.

6. The vehicular radar assembly of claim 1, wherein the biasing mechanism includes at least one compression spring.

7. The vehicular radar assembly of claim 1, wherein the radar mount and radar carriage each includes a spring seat, wherein a spring of the biasing mechanism is seated within the spring seats of the radar mount and radar carriage, and wherein the biasing mechanism in the use position is at least partially compressed between the radar mount and radar carriage.

8. A vehicle comprising:
a radar mount coupled to a frame;
a radar carriage biased away from the radar mount to a use position; and
a radar module coupled to the radar carriage; wherein
when an impact force is exerted against the radar module, the radar carriage is biased toward the radar mount until the impact force is removed, wherein the radar carriage is returned to the use position.

9. The vehicle of claim 8, further comprising:
a biasing mechanism extending between the radar mount and the radar carriage, the biasing mechanism biasing the radar carriage toward the use position.

10. The vehicle of claim 9, further comprising:
a sliding assembly defined between the radar mount and the radar carriage, wherein the sliding assembly cooperates with the biasing mechanism to provide a generally linear movement of the radar carriage away from and toward the use position.

11. The vehicle of claim 8, wherein the radar carriage includes an impact member that extends forward of the radar module, wherein the impact member is adapted to receive at least a portion of the impact force.

12. The vehicle of claim 8, wherein the radar module is a front braking module and the radar mount is attached to the frame proximate a front grill of the vehicle.

13. The vehicle of claim 9, wherein the biasing mechanism includes two compression springs.

14. The vehicle of claim 13, wherein the use position is defined by the compression springs being at least partially loaded.

15. The vehicle of claim 10, wherein the sliding assembly includes a plurality of guide slots defined within the radar carriage, the plurality of guide slots spaced about a perimeter of the radar carriage, wherein a plurality of mating tabs of the radar mount extend through each of the guide slots, respectively.

16. The vehicle of claim 15, wherein the radar carriage includes four guide slots.

17. The vehicle of claim 15, wherein the biasing mechanism includes first and second springs that are positioned proximate each guide slot of the plurality of guide slots, respectively.

18. A vehicle radar assembly comprising:
a radar module attached to a radar carriage;
a radar mount that slidably engages the radar carriage, wherein the radar carriage is biased away from the radar mount to a use position; and
a sliding assembly defined between the radar mount and the radar carriage that defines a generally linear movement of the radar carriage when an impact force is exerted against the radar module.

19. The vehicle radar assembly of claim 18, further comprising:
a plurality of biasing mechanisms that cooperate with the sliding assembly to bias the radar carriage to the use position, wherein after the impact force is exerted and the radar carriage is biased along the sliding assembly away from the use position, the plurality of biasing mechanisms bias the radar carriage and the radar module back to the use position.

20. The vehicle radar assembly of claim 18, wherein the radar module is a front braking module adapted to be positioned proximate a front grill of a vehicle.

* * * * *